Oct. 31, 1933.                F. E. CARLSON                1,932,616
                             WEIGHING SCALE
                          Filed Nov. 18, 1927          3 Sheets-Sheet 1
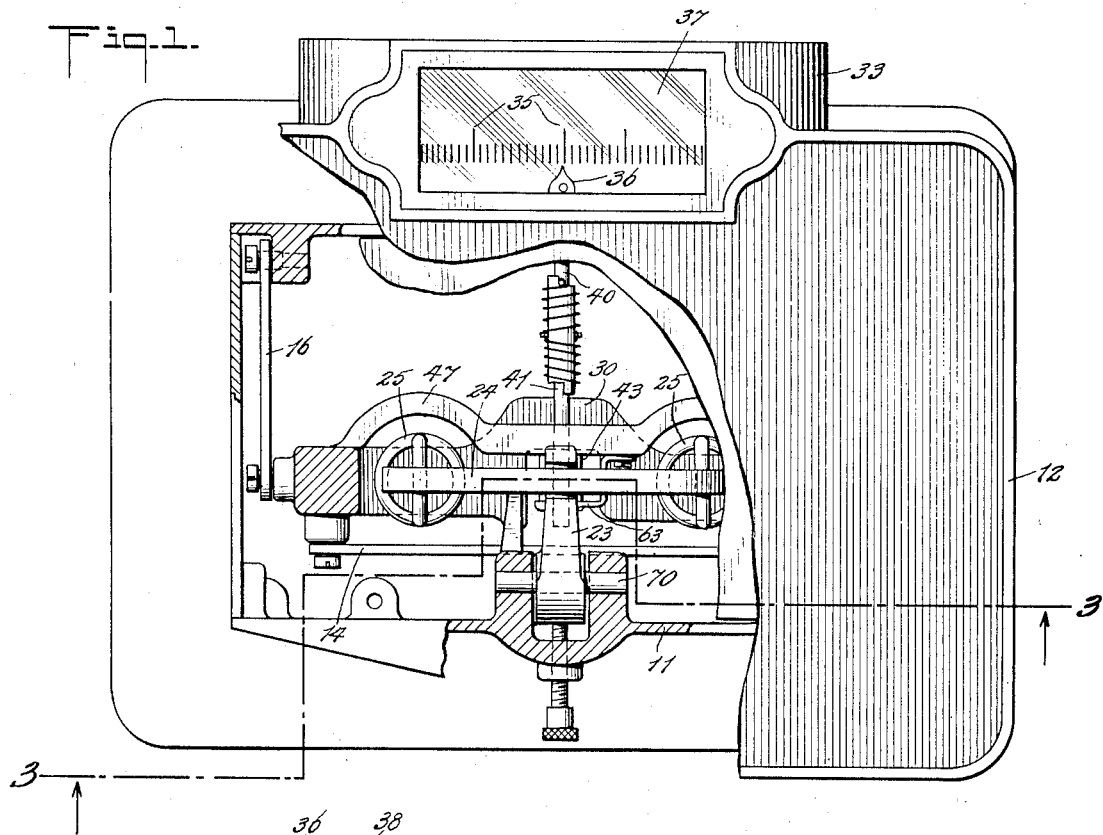
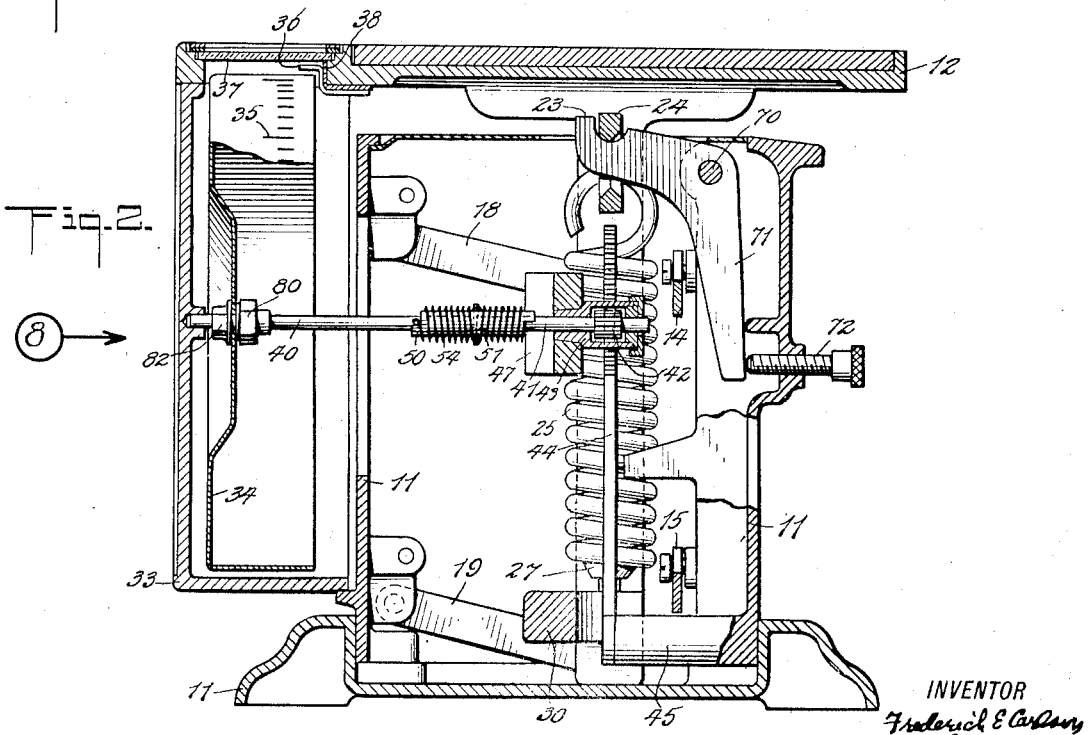
INVENTOR
Frederick E. Carlson
BY
ATTORNEY Oct. 31, 1933.   F. E. CARLSON   1,932,616
WEIGHING SCALE
Filed Nov. 18, 1927   3 Sheets-Sheet 2

Frederick E Carlson
INVENTOR
BY Philipp Sawyer
Rice Kennedy
ATTORNEYS

Oct. 31, 1933.  F. E. CARLSON  1,932,616
WEIGHING SCALE
Filed Nov. 18, 1927   3 Sheets-Sheet 3
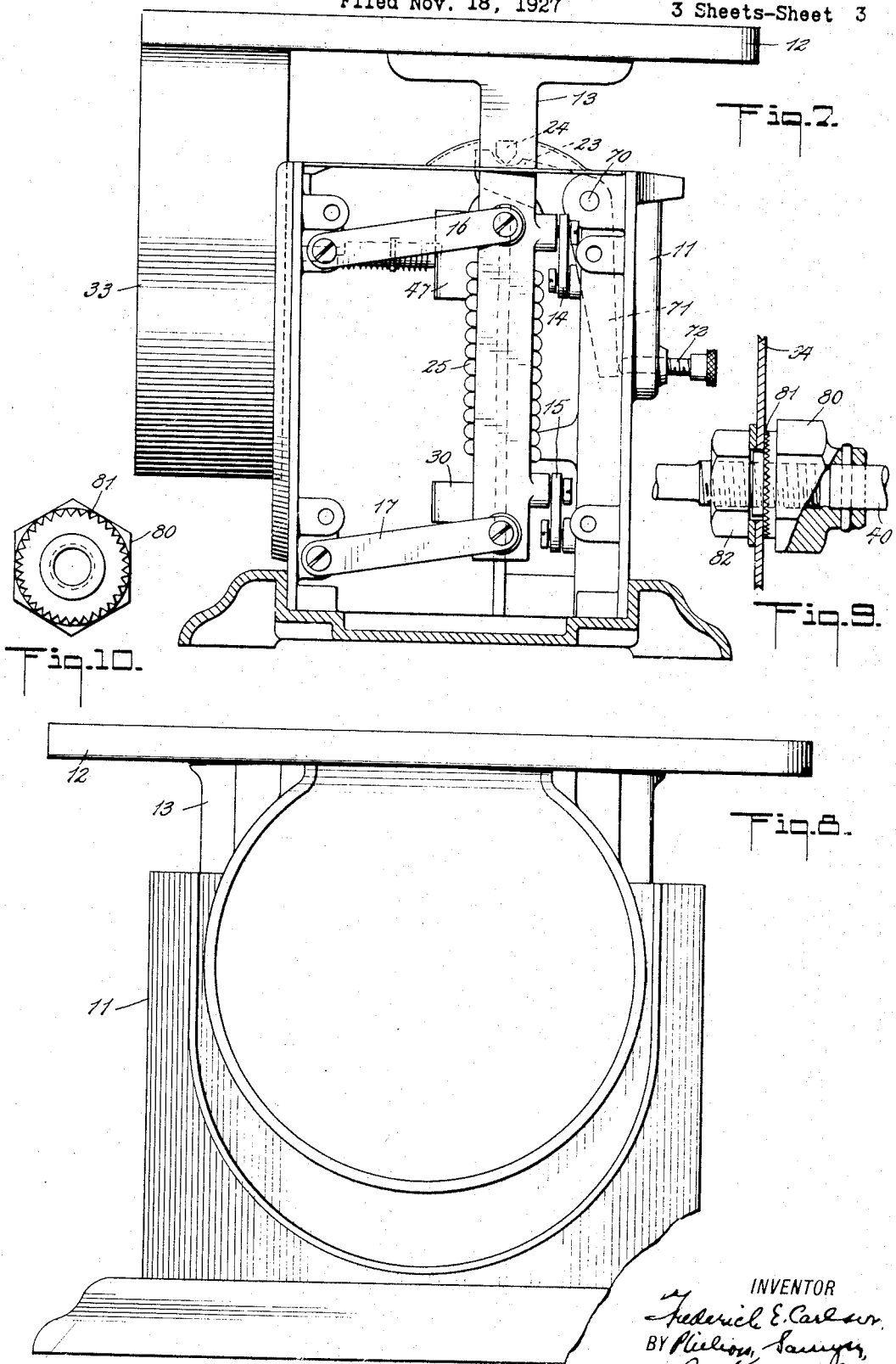

Patented Oct. 31, 1933

1,932,616

UNITED STATES PATENT OFFICE 1,932,616

WEIGHING SCALE

Frederick E. Carlson, New Britain, Conn., assignor to Landers, Frary & Clark, New Britain, Conn., a corporation of Connecticut Application November 18, 1927
Serial No. 234,073

12 Claims. (Cl. 265—68)

This invention relates to weighing scales and more particularly to scales of the so-called bathroom type. Such scales comprise a platform on which a person may stand and a dial adjacent the platform, whereby the entire scale is small and compact.

It is an object of the invention to provide a scale of simple and economical construction and one in which inaccuracies of dial readings are avoided.

It is a further object of the invention to provide a scale such that the dial takes its position, under loads, easily and quickly and without undue quivering.

With these general objects and others in view, the invention consists in the features, combinations, details of constructions and arrangements of parts which will first be described in connection with the accompanying drawings and then more specifically pointed out.

In the drawings:

Figure 1 is a top plan view with parts broken away of a scale constructed in accordance with the invention;

Figure 2 is a sectional view taken on the line 2—2 of Fig. 3;

Figure 7 is a sectional view taken on the broken line 7—7 of Fig. 3;

Figure 8 is a view in front elevation;

Figure 9 is a detail view (enlarged) showing the dial hub; and

Figure 10 is a face view of the dial hub.

Figure 3:
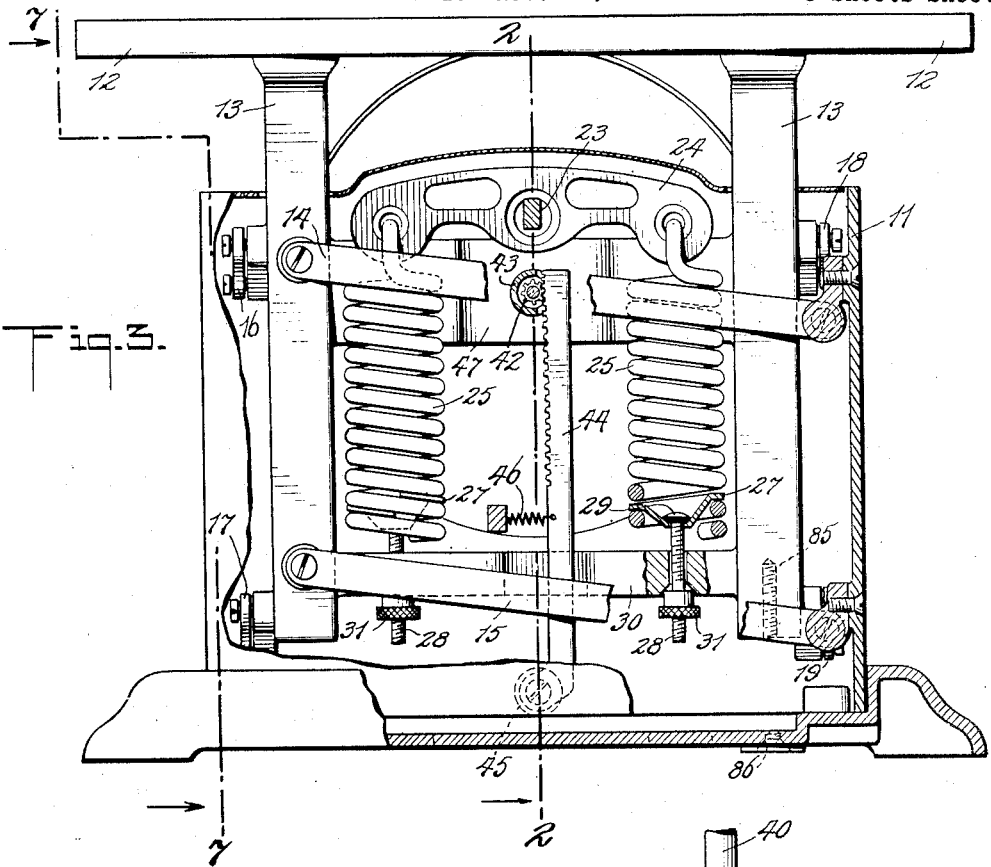
Figure 3 is a sectional view taken on the broken line 3—3 of Fig. 1.

Referring to the drawings, the scale here illustrated as an example comprises a main or stationary frame 11 for seating on a floor or other support. A weighing platform 12 is carried by a movable frame 13 largely enclosed within the stationary frame. The movable frame is connected with the stationary frame to have its movement guided in two right-angled directions. To this end, as here shown as an example, at the rear of the scale are upper and lower guiding links 14, 15. One end of each link is pivoted to the stationary frame, the other end to the movable frame. At one side of the scale are upper and lower guiding links 16, 17, extending at right angles to the links 14, 15. One end of each of these links is pivoted to the main frame, the other end to the stationary frame. At the other side of the scale, and parallel to links 16, 17, are similar links 18, 19. By means of these several links the movable frame is guided or controlled in its movements.

There is provided a weighing-spring connection between the movable frame and stationary frame. To this end, as here shown as an example, pivotally hung on a supporting hanger 23 carried by the stationary frame is a spring-equalizing yoke 24. A pair of weighing springs 25 have their upper ends hooked into suitable holes in yoke 24. The lower ends of these springs are anchored to the movable frame in a manner hereinafter described. When a load to be weighed is placed on the weighing platform, the resulting downward movement of the movable frame is opposed by the springs, the frame having a movement proportioned to the superimposed weight. Upon removal of the load, the springs re-contract and return the parts to initial position.

While the weighing springs may be anchored to the movable frame in any suitable manner, as here shown as an example, gripped between two lower turns of each spring is a washer 27, dished as shown in Fig. 3 and distorted to conform to the convolutions of the spring. Passing through a suitable hole in the washer is an anchoring bolt 28 having a rounded head 29. This bolt passes through a suitable hole in a cross piece 30 of the movable frame and below the cross piece is an adjustably mounted abutment nut 31. When the platform and its frame are moved downwardly under the load, cross piece 30, bearing against nuts 31, causes the bolts to extend the springs through heads 29 and washers 27. Heads 29 and the holes in the washers are machined to size and provide a swivel or ball-and-socket connection that permits the springs to center themselves without binding. With this construction the springs will be equally tensioned throughout, promoting scale accuracy. As shown in Fig. 3, in the present embodiment the head of nut 31 takes into a beveled recess in the cross piece and centers the bolt against side sway.

In constructions embodying the invention to what is now considered the best advantage, the thickness of that portion of the washer that lies between adjacent coils will be greater than the coil separation under maximum load. This construction tends to insure equal dial movements for equal load increments.

The invention in its entirety includes a dial housing and dial carried by and movable with the weighing platform and an operating connection for causing registering movement of the dial upon movement of the movable frame. As here shown as an example, secured to the underside of the platform and extending downwardly outside the front face of the stationary frame, is a dial housing 33. Located within this housing is a registering dial 34 of the drum type bearing suitable graduated indicia 35. Extending over the dial is a pointer 36 secured to the platform. Above the pointer, the platform, which here forms a cover for the dial housing, has a window 37. Thus the dial readings are easily read by a person standing on the platform.

With the dial housing and dial moving with the platform frame, excessive friction and lost motion are avoided and inaccuracies in dial readings for different positions of the load on the platform are avoided.

Extending down from the inner and side edges of the window is a metal band 38 which serves as a light reflector. This reflector tends to concentrate the light rays on the scale markings 35 to make easy dial readings.

While the means for causing rotation of the dial drum may vary, in constructions embodying the invention to what is now considered the best advantage the operating means will include a two-way yieldable connection. This may be accomplished by a split shaft and oppositely disposed compensating springs. In the embodiment here illustrated as an example, the dial is mounted, in a manner later described, on a shaft section 40 having its outer end journaled in the dial housing 33. In line with shaft section 40 but separate therefrom is a complementary shaft section 41. On the latter is a pinion 42 enclosed in a pinion housing 43 mounted in a cross piece 47 of the movable frame. To this end, as shown, rack 44 is pivoted to a boss 45 on the main frame and is yieldably held to its duty by a spring 46. When the platform is depressed, pinion 42 is rotated by riding down the rack. The resulting rotation of shaft section 41 rotates shaft 40, by a connection to be described, and this rotates the dial to register the weight. Reverse dial movement is similarly effected by the pinion riding up the rack as the platform returns to initial position.

As is more fully shown in Fig. 3, rack 44 is pivoted with the pivot center slightly off the rack pitch line. This enables the rack to speed up the pinion movement slightly to compensate for the slight retarding of the pinion due to its slight out-of-line movement as the links swing downward. With this construction, slow or under-weight registering is avoided and accurate dial readings are obtained.

The two adjacent ends of shaft sections 40, 41 are enclosed by a common sleeve 50. A spring 51 is coiled around the sleeve and has one end hooked around a pin 52 on shaft section 41 and the opposite end hooked around a pin 53 on the sleeve. A second spring 54 is coiled around the other end of the sleeve and has one of its ends hooked over the opposite end of pin 53 and its other end hooked over a pin 55 on shaft section 40. These springs are wound right- and left-hand. Relative movement of shaft section 41 with respect to the sleeve is limited in the direction urged by the spring by a stop shoulder 56 formed on the sleeve in a position to be engaged by pin 52. A similar but oppositely disposed shoulder 57 on the opposite end of sleeve 50 serves as a stop for pin 55 to limit the relative movement of shaft section 40 in the direction urged by its spring.

Under an easy and gradually applied load, the two shaft sections rotate as one, motion of shaft 41 being transmitted to shaft 40 by the connection described. Under sudden excessive loads, however, either shaft section may rotate against its spring relatively to the sleeve, whereby such sudden movements are taken up by the springs. With the construction described, the strain is taken off the rack and pinion and quivering of the dial is prevented. The dial can make slow and easy movements, regardless of the character of load application and take its proper position easily and quickly. The connection described, moreover, acts, to a certain extent, as a universal joint and dial accuracy is not affected if the dial housing should be slightly out of proper alinement.

Referring back to pinion housing 43, in the embodiment illustrated the housing itself is a one-piece cylindrical member having a suitable slot 60 to provide access to the pinion for the rack. Inserted into the outer end of the housing is a bearing 61 for shaft 41 and the parts are retained in position by a cap 62 formed as a part of a bracket 63 secured to cross piece 47. This bracket also serves as a stop to prevent undue movement of the rack away from the pinion. With the construction described, the housing is a single part that may be made on an automatic machine.

Figure 4:
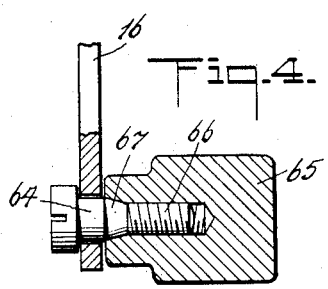
Figure 4 is a detail sectional view (enlarged) showing a link pivot.
Figure 5:
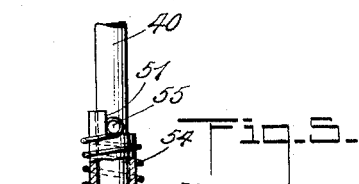
Fig. 5 is a detail view showing partly in section (enlarged) and with parts broken away, the dial shaft.

In the construction here illustrated the several guiding links and the rack are pivoted in a manner to prevent sidewise yield or loosening of the pivot. Referring to Fig. 4, link 16 is pivoted to a boss, or anchorage element 65 by a pivot screw 66. Adjacent the head of this screw is an unthreaded shank portion 64 which serves as a pivotal bearing for the link. Between this bearing and the thread is a tapered shank portion 67. The boss is reamed with a corresponding taper. When the screw is tightened up the tapered shank is driven home into the reamed taper. This construction gives the effect of a driven-in stud and prevents sidewise yield and loosening of the screw under heavy or uneven loads. The construction illustrated in Fig. 4 may be considered as typical of all the link pivots and the rack pivot.

There is provided means for adjusting the initial position of the parts. To this end, as here shown, the hanger 23 for the yoke 24 is in the form of a bell crank lever pivotally mounted in the main frame by means of a pivot pin 70. The downwardly extending arm 71 of this bell crank is arranged to be engaged by the end of an adjusting set screw 72 threaded through the wall of the main housing. By advancing the adjusting screw 72 the bell crank is moved to cause hanger arm 23 to give the movable frame a raised initial position. When the adjusting screw is withdrawn the bell crank reverses, the movable frame taking a lower initial position. With the construction described the dial can be given a plus or minus zero setting.

Referring back to the dial mounting, in the embodiment here illustrated, the dial 34 is in the form of an open sided drum, the registering graduations being on the periphery of the drum. This dial is formed of some relatively soft metal, e. g. aluminum. Threaded onto the shaft 40 near its end is a dial hub 80 formed of some relatively hard metal, e. g. steel. The face of this hub that engages the dial wall is provided with a series of burrs 81 by means of any suitable knurling mechanism. On the shaft 40 beyond the dial wall is a dial nut 82. In assembling the parts the shaft end is passed through a suitable opening in the dial wall until the burred face of hub 80 substantially engages the dial. The dial nut 82 being tightened up, the dial wall is drawn up against the hub and the burrs 81 dig or bite into the relatively soft dial metal thus securely locking the dial to its shaft.

Figure 6:
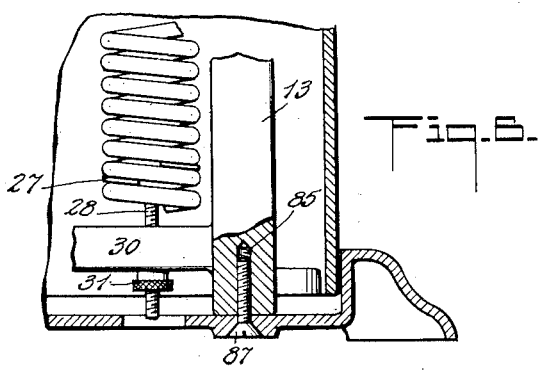
Figure 6 is a detail view in vertical section, of the scale arranged for shipment.

The invention in its entirety includes means whereby the relatively movable parts may be securely locked against movement for packing, shipment and the like. To this end, as here shown (Figs. 3 and 6), one of the uprights of the movable frame is provided with a tapped thread, as shown at 85. Opposite this tapped thread is a threaded screw hole 86 formed in the bottom of the stationary frame. When it is desired to lock the moving parts, as for shipment, the movable frame is depressed and while so held a locking screw 87 is threaded through hole 86 into the tapped thread of the movable frame. Fig. 6 shows the movable frame locked at maximum depression but a slight depression is sufficient. With the screw in threaded engagement with both the stationary frame and movable frame, the latter is firmly locked against relative movement in either direction. As a result, the damage by jouncing of the movable parts is prevented regardless of rough handling in transit or the like.

What is claimed is:

1. In a scale, and in combination, a stationary frame, a movable frame, a weighing platform thereon, a weighing spring connection between the movable frame and the stationary frame, a dial housing carried by the movable frame, a registering dial in said housing, and means for causing registering movement of said dial upon movement of the weighing platform.

2. In a scale, and in combination, a stationary frame, a movable frame, a weighing platform thereon, a weighing spring connection between the movable frame and the stationary frame, a dial housing carried by the movable frame, a registering dial in said housing, a rack carried by the stationary frame, a pinion carried by the movable frame, and a shaft connection between the pinion and the dial, whereby the dial is rotated upon movement of the weighing platform.

3. In a scale, and in combination, a stationary frame, a movable frame, a weighing platform thereon, a registering dial, a dial shaft, an actuating shaft axially aligned therewith, a yieldable connection therebetween including a relatively movable shaft receiving sleeve and spring means normally holding said sleeve against relative movement, said sleeve being relatively movable only against the tension exerted by said spring means, and means for causing dial registering movement of said actuating shaft by movement of said weighing platform.

4. In a scale, and in combination, a stationary frame, a movable frame, a weighing platform thereon, a weighing spring connection between the two frames, a registering dial, a rack and pinion connection between the two frames, and a split shaft connection between said first named connection and said dial, said split shaft connection comprising a pair of adjacent shaft sections, a sleeve enclosing the adjacent ends of said shaft sections, and oppositely disposed springs yieldingly connecting the respective shaft sections with said sleeve.

5. In a scale, and in combination, a stationary frame, a movable frame, a weighing platform thereon, a plurality of guiding links pivotally connected between the two frames, a pinion carried by the movable frame, a registering dial operatively connected with said pinion, a rack meshing with said pinion said rack being pivoted to the stationary frame with the pivot center off the rack pitch line.

6. In combination, an anchorage element tapped to receive a pivot screw and provided with a reamed taper adjacent the tapped thread, an element relatively movable with respect to the anchorage element, and a pivot screw having a threaded shank portion for threading into the anchorage element, an unthreaded shank portion on which the movable element has a pivotal bearing, and a tapered portion taking into said reamed taper.

7. In a scale, and in combination, a stationary frame, a movable frame, a weighing platform on said movable frame, guiding links pivotally connecting the movable frame and the stationary frame, and pivots for said guiding links comprising screws having threaded portions taking into tapped threads, and tapered portions taking into reamed tapers.

8. In a scale, and in combination, a stationary frame, a movable frame, a weighing platform on said movable frame, a registering dial, a connection between the movable frame and said dial including a rack and pinion, and means for pivotally mounting said rack including an anchorage element having a tapped thread and a reamed taper, and a pivot screw having a threaded portion for taking into said tapped thread and a tapered shank portion taking into said reamed taper.

9. In a scale, and in combination, a main frame, a movable platform frame, link connections between said frames to allow said platform frame to be movable with a guided movement in two directions, an equalizing yoke pivoted to the main frame, a pair of weighing springs connected to the ends of said yoke, and connections between the other ends of the springs and the platform frame including ball and socket joints.

10. In a scale, and in combination, a main frame, a movable platform frame, link connections between said frames to allow said platform to be movable with a guided movement in two directions, an equalizing yoke pivoted to the main frame, a pair of weighing springs connected to the ends of said yoke, a washer gripped by the lower turns of the coils of each spring, a roundheaded bolt extending through said washer and through said platform frame, and an abutment nut on the outer end of said bolt.

11. In combination with a shaft, a hub on said shaft, a dial, through which said shaft passes, formed of relatively soft material, a series of burrs on the face of said hub opposed to said dial, and a nut on the shaft for clamping the dial against said hub, whereby the burrs dig or bite into the metal of the dial to lock the dial to the shaft.

12. In a scale, a stationary frame, a movable platform frame, a registering dial, means for causing rotation of the dial upon movement of the platform frame, said stationary frame having a threaded screw hole and said platform frame having a tapped thread in line with said screw hole, whereby a screw may be inserted through the stationary frame, into the movable frame to lock the movable frame against movement for shipping or the like.

FREDERICK E. CARLSON.